United States Patent [19]

Chapman et al.

[11] Patent Number: 4,737,774
[45] Date of Patent: Apr. 12, 1988

[54] MAGNET BASED ACTIVITY SENSOR

[75] Inventors: Richard C. Chapman; Michael E. Hamerly, both of Brooklyn Park, Minn.

[73] Assignee: CompuCap, Inc., Brooklyn Park, Minn.

[21] Appl. No.: 897,127

[22] Filed: Aug. 15, 1986

[51] Int. Cl.$^4$ .............. G01P 15/08; G08B 23/00; A01K 15/00
[52] U.S. Cl. .............. 340/573; 73/493; 73/517 R; 73/DIG. 3
[58] Field of Search .......... 73/517 R, 516 R, DIG. 3, 73/493; 340/573, 669

[56] References Cited

U.S. PATENT DOCUMENTS

| | | | |
|---|---|---|---|
| 3,129,347 | 4/1964 | Tognola | 73/517 R |
| 3,769,844 | 11/1973 | Skoures | 73/517 R |
| 3,867,844 | 2/1975 | Shimizu et al. | 73/517 R |
| 4,234,876 | 11/1980 | Murai | 340/573 |
| 4,311,051 | 1/1982 | Eon et al. | 73/517 R |
| 4,561,299 | 12/1985 | Orlando et al. | 73/517 R |

FOREIGN PATENT DOCUMENTS

| | | | |
|---|---|---|---|
| 3016001 | 10/1981 | Fed. Rep. of Germany | 73/517 R |
| 3021317 | 12/1981 | Fed. Rep. of Germany | 73/517 R |

OTHER PUBLICATIONS

Brochure by Runtronics Incorporated, "RunAlert Impact-Stress Meter, You Shouldn't Be Running Without It!".

Lopez, Michael D. et al., "Easy Steps to Safer Running With RunAlert Impact-Stress Meter," pp. 1–10.

Technology and the Scientist, Proceedings of the 1985 Arctic Science Conference, "Measurement of Activity—An Example of Microcomputers in Animal Collars for Data Collection and Retrieval," Sep. 27–29, 1985, p. 54.

Montoye, Henry J. et al., "Estimation of Energy Expenditure by a Portable Accelerometer," *Medicine and Science in Sports and Exercise*, vol. 15, No. 5, pp. 403–407, 1983.

Gillingham, Michael P. and Bunnell, Fred L., "Reliability of Motion–Sensitive Radio Collars for Estimating Activity of Black–Tailed Deer," *J. Wildlife Management* 49(4), pp. 951–958, 1985.

*Primary Examiner*—John Chapman
*Attorney, Agent, or Firm*—Kinney & Lange

[57] ABSTRACT

An activity sensor which provides an indication of motion caused by changes in acceleration of a person or animal, and wherein such changes of motion are sensed by a movable magnet which is biased to a rest position along a guide. The axis of the path of movement of the movable magnet is substantially parallel to the direction of accelerations of interest. A Hall effect sensor is provided for sensing motions of the movable magnet from its rest position, and it provides an output proportional to these movements.

6 Claims, 1 Drawing Sheet

MAGNET BASED ACTIVITY SENSOR

BACKGROUND OF THE INVENTION

1. Field of the Invention

The present invention relates to activity sensors that will sense motion and thus activity, and which is suitable for use for sensing activity of people and animals.

2. Description of the Prior Art

Various activity or motion sensors have been advanced, which measure accelerations in selected axes. One such device is sold under the mark RunAlert sold by RunTronics Incorporated, 1301 Shoreway Road, Belmont, Calif. 94002. This device is used by runners to provide a measure of acceleration loading during jogging. The RunAlert is made so that it will provide a beeping sound to indicate when a specific acceleration has been achieved, and in this way determine whether or not excessive loads are being placed on the legs and joints of the body due to impact stress. The RunAlert device is essentially a "G" meter that can be set at successively higher levels to determine when the acceleration or "G" forces exceed a set level. Only an audio signal is provided with this device.

Additionally, activities of deer have been monitored through the use of a mercury "tip" switch device mounted onto a collar on the animal. Such a device and its operation is discussed in an article entitled "Reliability of Motion-Sensitive Radio Collars for Estimating Activity of Black-Tailed Deer", M. P. Gillingham and F. L. Bunnell; J. Wildl, Manage, 49(4):951-958 (1985). This article indicates that motion sensing to monitor activities of deer and other animals has been attempted, but that the accuracy of the then existing devices was questionable. Particular problems were encountered in sensing slow movements which resulted in low accelerations.

Thus, activity sensors for use both by humans and in wild animal research are highly valuable for determining the activity levels, and with the ability to provide an electrical signal which can be stored and which does not require large power supplies, or complex circuitry.

SUMMARY OF THE INVENTION

The present device relates to a magnet based activity and motion sensor that provides an output which is a function of acceleration along a selected axis and thus the sensor is capable of determining the movement or activity levels of people or animals. The activity sensor can be oriented to sense motions along any desired axis of motion. The apparatus comprises a guide, in the form of the invention shown, a tube, in which a movable permanent magnet is slidably mounted and guided with a preselected magnetic pole orientation. At least one additional bias magnet is fixed at one end of the guide tube. The fixed magnet is arranged so that the facing magnetic poles of the movable magnet and the stationary magnet are the same polarity so that there is a repelling biasing force tending to cause the movable magnet to "float" in the guide.

A Hall effect sensor, of known design, is mounted in the same end of the tube as the bias or stationary magnet. The Hall effect sensor is connected in circuit so that each time the movable magnet accelerates relative to the Hall effect sensor, a change in the output signal of the Hall effect sensor occurs according to known principles. This change in signal of the Hall effect sensor is digitized or processed to provide an output signal which indicates that a certain level of acceleration was sensed. The processing circuit can use one or more comparators to provide pulses which indicate reaching or exceeding a threshold level of activity, if desired. The number of pulses in such an output circuit is proportional to the number of times that the floating magnet or movable magnet accelerates the calibrated amount.

The sensor output signal level for triggering the comparator or comparators can be adjusted, and when more than one comparator is used, signals that indicate successively higher sensor output signal levels are generated to indicate different activity levels of the person or animal being monitored. The number of pulses of a particular signal level generated during a time period indicates the amount of overall activity.

A simple analog to digital circuitry is provided for providing output pulses at different activity levels. The pulse output from the circuit can be stored in a memory or used for driving a microprocessor, or a direct reading indicator if desired. Storage of the signals in memory in a known manner is of substantial importance in studying animal activity in particular. The data can be stored on memory devices carried on the same collar as activity sensors and analyzed at a later time. By using two activity sensors, one oriented for determining vertical accelerations, and the other oriented for determining horizontal accelerations, the type and scope of animal activities can also be determined.

The activity sensor also can be used for monitoring human activities, such as running and jogging, and the data analyzed for determining the levels of activity and also indicating shock loads on knee joints, for example.

The activity sensor is simple to make, lightweight, and provides very reliable outputs even with small acceleration loads or G forces being exerted. The unit can be calibrated by exerting a known force onto the movable magnet tending to move it against the magnetic field bias force of the fixed permanent magnet. The output of the Hall effect sensor is calibrated at such force to provide a comparator signal to be associated with a given force. A change of calibrated output can be provided as necessary.

As shown, the guide for the movable magnet is tubular and low friction material may be used for the engaging surfaces between the magnet and the guide tube. In addition, dampening materials can be used in the tube for dampening oscillations of the movable magnet.

Specifically in the form shown, an animal collar is illustrated for supporting the activity sensors. These collars can be used, as presently is known, to carry radio receivers, transmitters and digital memory storage for relaying information to ground stations, and also for receiving commands to cause actions to occur (such as injection tranquilizing darts carried on the collar to tranquilize the animal).

While animal collars are shown, it should be understood that the sensor can be mounted onto a belt on a person, or clipped in place on clothing, or even embedded into an animal or human if desired.

The circuitry used has low power consumption so small batteries can be used for power, and an extended life can be expected.

DETAILED DESCRIPTION OF THE PREFERRED EMBODIMENTS

Figure 1:
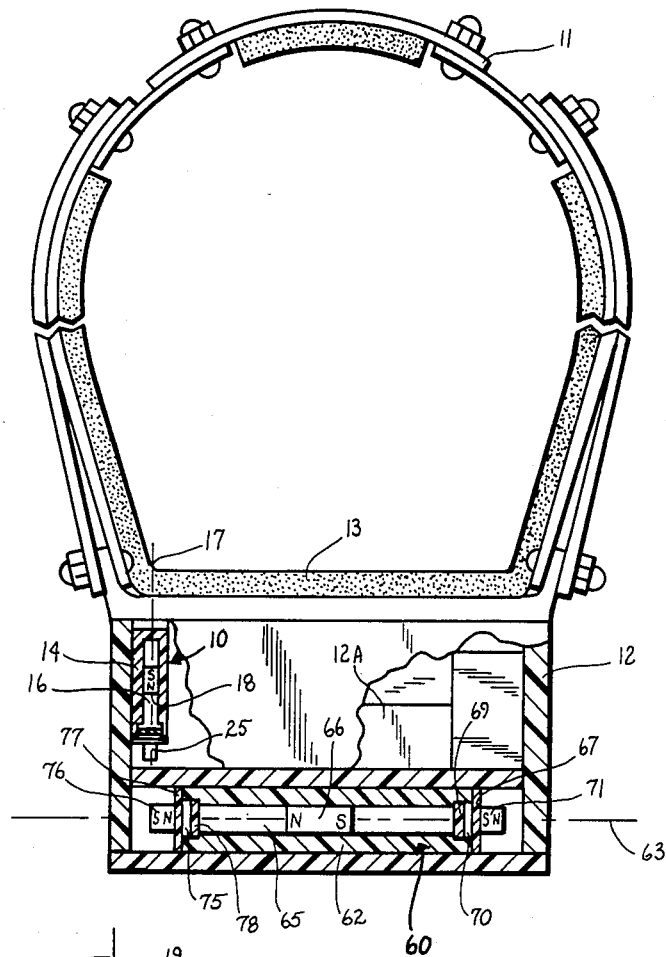
FIG. 1 is a front elevational view of a typical animal collar having activity sensors made according to the present invention installed thereon.

Referring to FIG. 1, a first activity sensor indicated generally at 10 is mounted in a battery and instrument housing 12 fixed on an animal collar 11. The collar is made up of individual sections fastened together with fasteners, which permit adjusting the collar size for different animals. The battery and instrument housing 12 is attached at the lower side of the collar. The animal collar 11 may be lined with a foam rubber pad 13. When installed on an animal's neck, the weight of housing 12 and the equipment carried in the housing keep the collar 11 properly oriented, so that the activity sensor 10 is in a desired orientation and has an axis that is substantially vertical, as shown. The collar 11 and housing 12 are of the type used for controlling drug injection darts as shown in U.S. Pat. No. 4,652,621. The housing may house radio receivers and a transmitter as well as digital components illustrated at 12A.

The animal activity sensor 10 includes an outer guide tube 14 made of non-magnetic material and having a closed end 15, and a central elongated cylindrical guide chamber 16 having a longitudinal axis generally indicated at 17. Tube 14 can be attached to the housing 12 (or to a belt clip) with tabs 19 or other suitable fasteners.

A movable magnet 18 is freely slidably mounted in the guide chamber 16, and is capable of moving along the axis 17 between the closed end 15 and a second end of the tube 14 which has a cover member 20 suitably removably mounted thereon. The cover member 20 is attached to the tube 14 in any suitable manner, such as by threading, so that it is fixed in the tube, to hold a Hall effect sensor indicated at 24 in place. The Hall effect sensor 24 can be a Honeywell Microswitch No. 634SS2, which includes excitation terminals and output terminals that provide a voltage output proportional to the strength of a magnetic field acting on the sensor. The Hall effect sensor is held in place at the end of the tube 14 against a spacer 24A, of non-magnetic material, is placed over the inner end of the Hall effect sensor 24 and is supported on an interior shoulder in tube 14. A Hall effect sensor which provides a current output signal between poles at right angles to a magnetic field impressed on the sensor and the current is proportional to the strength of the magnetic field. The sensor as purchased and used, converts the current to a voltage output at its output terminals.

Figure 2:
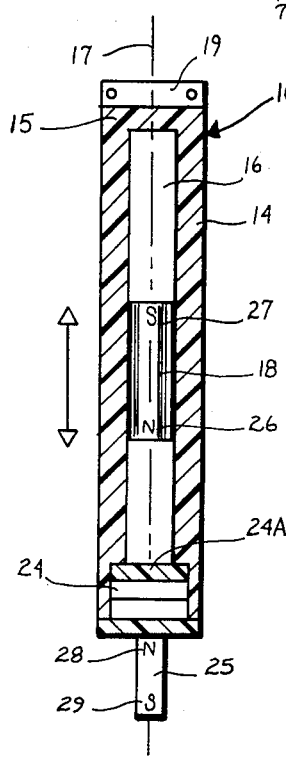
FIG. 2 is an enlarged, vertical sectional view of an activity sensor of the present invention.

A bias permanent magnet 25 is fixed to the outer end cap 20 with epoxy, for example. As can be seen, the movable guided magnet 18 has a first pole 26 (see FIG. 2) which as shown is the north pole, and a second (south) pole 27 which are oriented in opposite directions in the guide chamber 16. The fixed magnet 25 has a first pole 28 adjacent the cover 20. Pole 28 is a north pole, which is the same as the pole 26, so that the magnetic fields from the adjacent poles of the two magnets tend to repel the floating or movable magnet 18. The opposite (south) pole 29 of the fixed magnet 25 is to the exterior of the cap 20 as can be seen.

The collar 11 is made of nonmagnetic material, and any fasteners that are used, particularly adjacent to the activity sensor, are also of nonmagnetic material. The housing 12 also should be of non-magnetic material. Magnetic shielding may be provided for the activity sensor 10 if necessary.

With the activity sensor 10 oriented as shown in FIG. 1, any vertical axis accelerative movements of the animal, (in direction along the axis 17 of the guide tube 14) such as during running, will tend to cause the magnet 18 to move against the bias force from the bias magnet 25, as influenced by the force of gravity. Such movement will change the magnetic field on the Hall effect sensor 24 and change the output signal of the sensor, providing a signal proportional to the rate of change of position of magnet 18 which is the acceleration or "G" force involved. Using a suitable comparator circuit, a pulse output can be provided which indicates an acceleration above a calibrated level.

When an animal is essentially inactive, such as when standing, for example, no output is provided, but if there is any walking, running or shaking of the animal's head, an output would be high enough to be sensed. Comparators for providing output pulses at two different levels of activity may be used. The Hall effect sensor purchased has circuitry included which provides a voltage output which can be connected directly to an analog to digital converter for providing signals at small increments. However, pulse outputs also can be provided using simple circuitry as shown herein.

Figure 3:
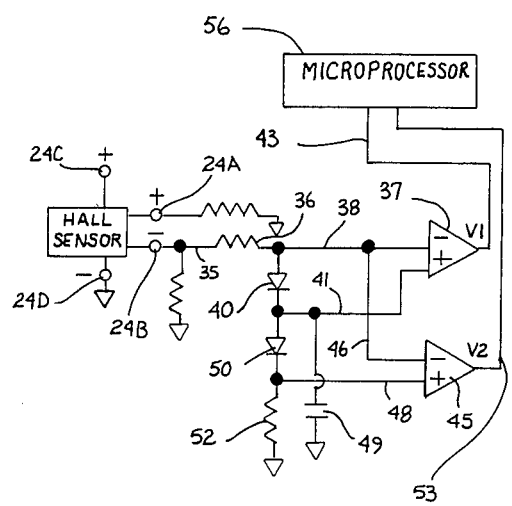
FIG. 3 is a schematic representation of a typical simplified analog to digital circuit that is used with the present invention.

Referring to FIG. 3, the Hall effect sensor 24 is shown schematically and has excitation terminals 24C and 24D. As shown, a plus terminal 24C is connected to a suitable power supply and the negative terminal 24D is connected to circuit common. The plus and minus output terminals are indicated at 24A and 24B, respectively. At rest, a reference level signal is generated because of the magnetic field acting on the Hall effect sensor, which will change due to the movement of the movable magnet 18. A voltage is provided on line 35 which is connected to the minus output terminal 24B. The positive output terminal 24A is connected to circuit common through a suitable resistor. Line 35 is coupled through a resistor 36 and a line 38 to the inverting input of a comparator amplifier 37. The noninverting input of the comparator 37 is coupled to line 38 through a diode 40, and a line 41. The triggering level of the comparator 37 is thus determined by the voltage drop of the diode 40.

A second comparator 45 has its inverting input connected with a line 46 to the line 38 and thus to the output terminal 24B of the Hall effect sensor 24. The noninverting input of the comparator 45 is connected to a line 48 that is coupled to the output of a diode 50 that is connected in series with the diode 40 to line 38. Thus, the voltage on line 48 is reduced by the voltage drop of both diodes 40 and 50 from the voltage on line 38. A capacitor 49 is connected between line 41 and circuit common and a resistor 52 is connected to line 48 and to circuit common. The capacitor 49 is thus coupled in parallel to the series combination of diode 50 and resistor 52 to provide a time constant adaptive threshold signal on the positive terminals of comparators 37 and 45. The capacitor also provides this threshold level so as the temperature changes the same voltage performance will be achieved. The threshold signal provides a reference voltage that is different on line 41 and line 48 by the voltage drop across diode 50. The sensor will sense acceleration induced voltage spikes so the time constant for holding the reference voltage on capacitor 49 has to be longer than the voltage spike duration. The component values can be selected to provide the proper time constant for the type of activity to be sensed.

The output of Hall effect sensor 24 is connected so the output voltage reduces as the magnet 18 moves closer to the sensor. Thus, with the series voltage drop required by the diode 40, comparator 37 will be triggered when the voltage level on line 38 from the Hall sensor reduces momentarily to be equal to the voltage drop of the diode 40. Typically the voltage on lines 35 and 38 will be 2.5 volts at rest. If the drop of diode 40 is 0.6 volts, when the voltage on line 38 is equal to 1.9 volts the comparator 37 will be triggered because line 41 is held at capacitor 49 and will provide a digital ($V_1$) output along line 43. The comparator 37 will be triggered at a lower level of activity than comparator 45 when the Hall effect sensor is connected as shown.

When the activity sensed is at a level so that the movable magnet 18 moves under acceleration forces, and creates a spike so the voltage on line 38 drops to be equal to the voltage drop across both diodes 40 and 50 (1.2 volts which is also the level held on line 48 by capacitor 49), the inputs to comparator 45 will be equal and the comparator 45 will provide an output signal ($V_2$) along line 53 (generally a 5 volt TTL or CMOS level signal) to processing circuitry. The capacitor 49 will recharge as the voltage spikes cycle.

The output signals on lines 43 and 53 will appear as pulses because the magnet 18 will reciprocate in the tube as a function of acceleration force level and direction. The pulses on lines 43 and 53 can be fed to a microprocessor or other digital sensing circuitry indicated generally at 56. For example, the signals can be provided to memory devices for storage and later use. This microprocessor and/or memory can also be stored in the housing 12 of collar 11 that leads to the Hall effect sensor 24. It should be noted that if an analog to digital converter is used, the positive output from the Hall effect sensor could be coupled to such converter and the output signal would increase as magnet 18 moved closer to the sensor 24. A digital number sequence indicating activity levels thus could be obtained.

A modified activity sensor that is useful for sensing horizontal accelerations, (lateral or side to side accelerations) is shown generally at 60. The activity sensor 60 comprises a tube 62 of non-magnetic material and is mounted on a horizontal wall, inside the housing 12 and is positioned with the longitudinal axis thereof, indicated at 63, extending horizontally. An interior wall of the housing 12 is shown above tube 62 to separate the components. The tube 62 forms a guide and has an interior passageway 65 therein in which a movable magnet 66 is slidably mounted. The surface of the passageway 65 may have a surface coating of low friction material, such as Teflon, indicated by the heavier lines, and the movable magnet 66 also can have such a coating. At a first end of the tube 62, a cap 67 is provided and it holds a Hall effect sensor 70 in place at this end of the tube. The cap 67 also carries a bias magnet 71 that has its north pole adjacent the cap, and it can be seen that the magnet 66 has its north pole facing the magnet 71. A spacer 69 is positioned between the Hall effect sensor 70 and magnet 66. The Hall effect sensor 70 is the same construction as sensor 24.

At the opposite end of the tube, a cap 77 is provided, and this optionally holds another Hall effect sensor 75 in position in the tube 62. A fixed bias magnet 76 is attached to the cover 77, with its south pole adjacent the cover 77 facing the south pole of the movable magnet 66. The south poles repel, as do the north poles, so the magnet 66 will assume a rest position determined by the strength of the magnets 71 and 76 relative to the magnet 66. A spacer 78 is provided between sensor 75 and magnet 66. The sensor 60 will work with only one Hall effect sensor at one end if the movable magnet is prevented from moving excessively far from the Hall effect sensor.

It can be seen that horizontal movements or accelerations in direction along the axis 63 will cause the magnet 66 to tend to shift in the guide passageway 65, and when magnet 66 shifts one way, it will cause the Hall effect sensor 70 to change in output, as previously explained, and when the magnet 66 shifts the other way, the changes in output of Hall effect sensors will be reversed.

When two Hall effect sensors 70 and 75 are used, they can be connected into circuitry so that they provide additive signals if desired. The signals from each Hall effect sensor on the same guide can be individually processed as well, for example, in the type of circuit shown in FIG. 3. The individual output signals can be fed to suitable microprocessor circuitry for processing. For horizontal sensing, however, two bias forces are desired to insure magnet 66 assumes a desired rest position properly spaced from the Hall effect sensor.

The activity sensors as disclosed are lightweight, relatively easily made, and are low cost. They also are foolproof in that the Hall effect sensors are very accurate and sensitive, and once calibrated by moving the movable magnet with a desired known force for calibration. If a comparator circuit is to be used, the comparator can be set to be triggered at desired, known force levels.

The activity sensor can easily be mounted to clothing or belts, with a small power pack integral with the activity sensor guide for powering the Hall effect sensor and output circuitry. The activity sensor and circuitry can be attached directly to the animal collar and provided with a remotely actuated separation mechanism if desired.

Although the present invention has been described with reference to preferred embodiments, workers skilled in the art will recognize that changes may be made in form and detail without departing from the spirit and scope of the invention.

What is claimed is:

1. An activity sensor comprising a guide tube having a smooth central bore and a longitudinal axis along the bore, a first movable permanent magnet slidably mounted in the bore of said guide tube for movement in direction along said axis, a tube cap member for closing at least one end of said tube, a second permanent magnet mounted on the cap member at one end of said guide tube and having its magnetic poles oriented to bias the first magnet along said bore away from the second magnet to a rest position, at least one Hall effect sensor for sensing the changes in magnetic field strength positioned in the bore of tube adjacent the second magnet and between the first and second magnets, and held in position by said cap member, and circuit means coupled to said Hall effect sensor for providing an output signal dependent upon movement of the movable magnet relative to the sensor.

2. The activity sensor of claim 1 wherein said circuit means includes means for determining when at least two different levels of acceleration move the movable magnet toward said fixed magnet.

3. The activity sensor as specified in claim 1 wherein said guide is mounted with its axis generally horizontal, and to which are mounted two fixed magnets, one on each end of said guide, said sensor being positioned adjacent at least one end of said guide for determining movement of said movable magnet from a rest position toward the opposite fixed magnet.

4. An animal activity sensor for attachment to an animal which causes acceleration to be sensed comprising a collar member for mounting on the neck of an animal, a guide tube having an axis, a first movable permanent magnet slidably mounted in said guide tube for movement in direction along said axis, the guide tube being attached with respect to the collar, a second permanent magnet mounted with respect to said guide tube at one end thereof having poles positioned to bias the first magnet along said guide in direction away from the one end to a rest position, and at least one Hall effect sensor positioned in the guide tube between the first and second magnets for sensing the changes in magnetic field strength of the movable magnet to thereby indicate activity of such animal.

5. The sensor of claim 4 wherein a third permanent magnet is mounted at the opposite end of the guide tube from the second permanent magnet.

6. In combination with a collar adapted to be placed onto an animal whose activity is to be sensed, said collar having a means to orient it in a reference position on the neck of such animal when in use, the improvement comprising an activity sensor assembly comprising a first sensor having a first tubular member with a central bore and a longitudinal axis along the bore oriented to be substantially vertical when the collar is installed on an animal, said first tubular member having a first permanent magnet slidably mounted in the bore thereof, a first Hall effect sensor at a lower end of said first tubular member, and a second permanent magnet mounted with respect to the lower end to cause repelling of the first permanent magnet and cause the first mentioned permanent magnet to be suspended by magnetic field effects spaced from the Hall effect sensor along the axis of the first tubular member; and a second activity sensor comprising a second tubular member having a central bore having an axis generally perpendicular to the axis of the first tubular member, said second tubular member having a third permanent magnet slidably mounted in the bore of the second tubular member, and fourth and fifth permanent magnets at opposite ends of said second tubular member to provide magnetic fields tending to position the third permanent magnet in the center portions of the bore of the second tubular member, and second and third Hall effect sensors positioned adjacent opposite ends of said second tubular member to sense movement of said third magnet along said second tubular member from a rest position determined by the fourth and fifth permanent magnets.

* * * * *